United States Patent [19]

Notagashira et al.

[11] Patent Number: 5,182,674
[45] Date of Patent: Jan. 26, 1993

[54] OPTICAL APPARATUS

[75] Inventors: Hidefumi Notagashira, Kanagawa; Tsuyoshi Akutsu, Tochigi, both of Japan

[73] Assignee: Canon Kabushiki Kaisha, Tokyo, Japan

[21] Appl. No.: 724,701

[22] Filed: Jul. 2, 1991

[30] Foreign Application Priority Data

Jul. 9, 1990 [JP] Japan .................................. 2-182256

[51] Int. Cl.$^5$ .............................................. G02B 7/02
[52] U.S. Cl. .................................... 359/694; 359/695; 359/825
[58] Field of Search ............................. 359/694–696, 359/823, 825, 830, 829

[56] References Cited

U.S. PATENT DOCUMENTS 3,888,568  6/1975  Norris et al. .................... 359/823

Primary Examiner—Constantine Hannaher
Assistant Examiner—Don Wong
Attorney, Agent, or Firm—Robin, Blecker, Daley & Driscoll

[57] ABSTRACT

Optical apparatus comprises an optical element and a moving mechanism having two members arranged to move the optical element in the direction of an optical axis thereof by moving one of the two members in the direction of the optical axis relative to the other while rotating said two members relative to each other. The two members include a male helicoid member having a male helicoid screw and a female helicoid member having a female helicoid screw arrangement in screw engagement with the male helicoid screw, the female helicoid screw arrangement providing only a single screw thread peripherally interiorly of the female helicoid member along an axis parallel to the optical axis.

27 Claims, 4 Drawing Sheets

OPTICAL APPARATUS

BACKGROUND OF THE INVENTION

1. Field of the Invention

This invention relates to an optical apparatus having a helicoid member.

2. Description of the Related Art

Some of the conventional lens-barrel drawing-out mechanisms have a female helicoid tube molded with a molding material. In forming the helicoid screw thread of the female helicoid tube, either a mold is slidden toward the inside circumference side of the female helicoid tube (a split mold type) or a mold is pulled out from the female helicoid tube while rotating the mold.

However, the method of forming the screw thread by sliding the mold toward the inside circumference side requires the mold to have a complex structural arrangement, which is not only expensive but also makes the cycle of molding longer, so that a manufacturing cost of the female helicoid tube increases disadvantageoulsy. Besides, in order to slide the mold toward the inside circumference side, the screw thread must be formed in such a shape as to avoid undercutting. Therefore, as shown in FIG. 4, the angle A of the screw thread becomes large. Then, with a male helicoid tube combined with the female helicoid tube, it is difficult to control and adjust the backlash of screw engagement in the optical axis direction of the lens barrel.

Meanwhile, the other method of forming the screw thread by rotating the mold has presented the following problem, i.e., in arranging a gear part or the like in a direction different from the direction of the lead of the helicoid screw, the gear part cannot be formed with the same mold. The gear part, therefore, must be formed separately from the helicoid screw thread.

SUMMARY OF THE INVENTION

It is an object of this invention to provide an optical apparatus wherein a screw thread of a female helicoid screw is formed in a female helicoid member in such a way as not to overlap in the direction of an optical axis, so that the female helicoid member including the screw thread can be molded with a stationary mold and a movable mold which is movable in the direction of the optical axis.

The above and other objects and features of the invention will become apparent from the following detailed description of an embodiment thereof taken in conjunction with the accompanying drawings.

DETAILED DESCRIPTION OF THE PREFERRED EMBODIMENT

Figure 1:
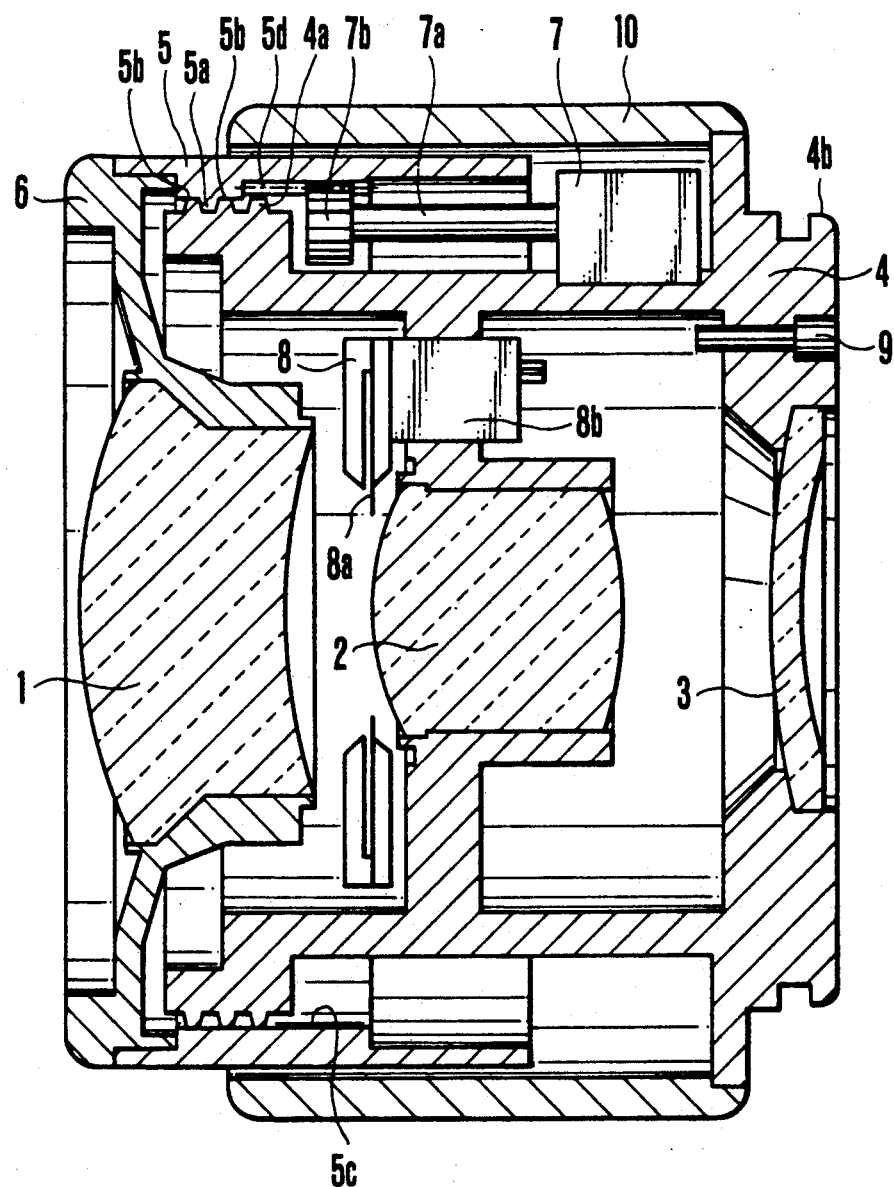
FIG. 1 is a vertical section showing interchangeable lens which is arranged according to this invention as an embodiment thereof.
Figure 2:
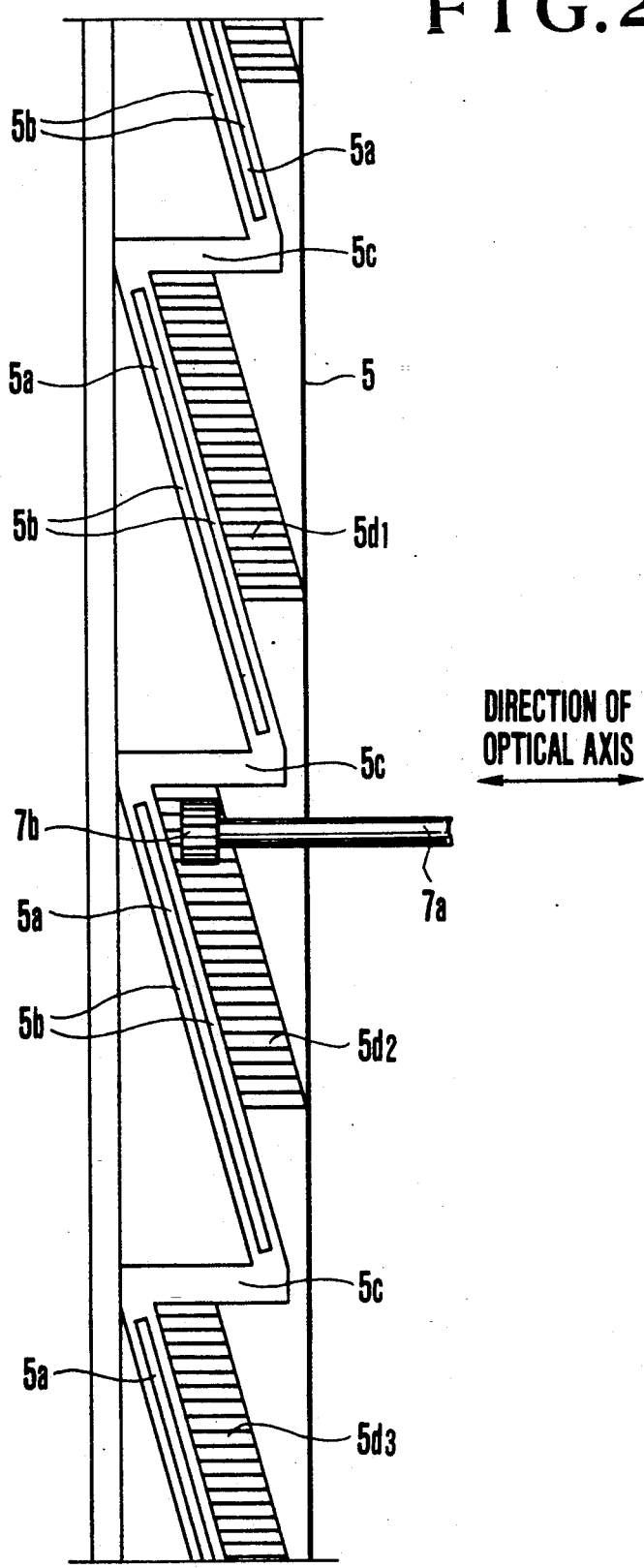
FIG. 2 is a development view showing the essential parts of the same interchangeable lens as viewed from the inside circumference side thereof.
Figure 3:
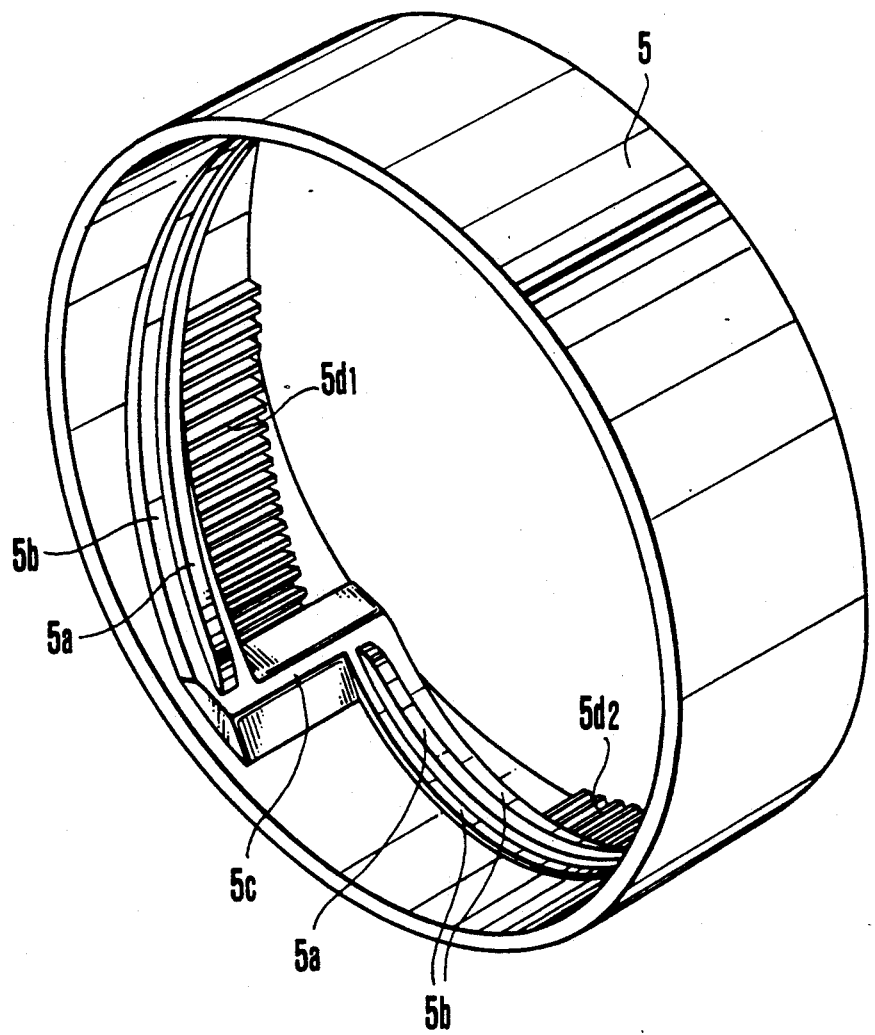
FIG. 3 is an oblique view of a female helicoid tube shown in FIG. 1.
Figure 4:
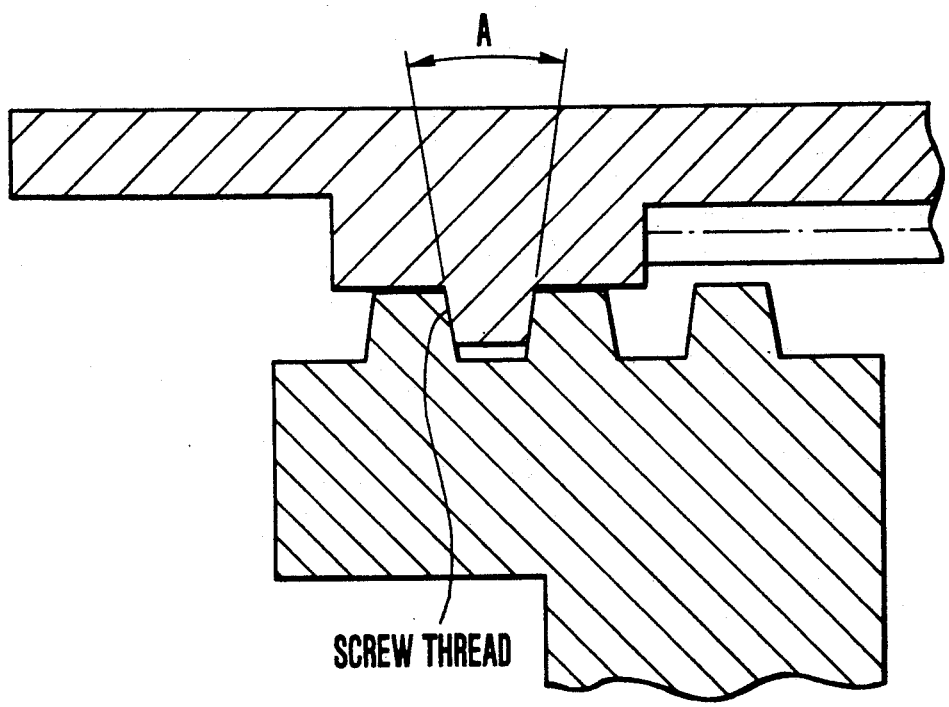
FIG. 4 shows the angle of the helicoid screw thread.

FIG. 1 shows in a vertical section a lens barrel arranged as an embodiment of this invention FIG. 2 shows in a development view a female helicoid tube as viewed from the inside circumference side thereof. FIG. 3 shows in an oblique view a female helicoid tube. In these figures, a reference numeral 1 denotes a first lens group. A numeral 2 denotes a second lens group. A numeral 3 denotes a third lens group. Each of these lens groups 1, 2 and 3 is an optical element consisting of either a single lens or a plurality of lenses.

A male helicoid tube 4 serving as a male helicoid member has a male helicoid screw part 4a and is provided with a mount claw 4b which is used for mounting the lens barrel on a camera body (not shown) and is formed in one body with the male helicoid tube 4. The above-stated second and third lens groups 2 and 3 are secured to the inside circumference side of the male helicoid tube 4.

A female helicoid tube 5 serving as a female helicoid member has a plurality of female helicoid screw parts 5a. Further, first abutting parts 5b are arranged before and after each of the female helicoid screw parts 5a in such a way as to extend along each of the female helicoid screw parts 5a. A plurality of sets of the female helicoid screw part 5a and the first abutting parts 5b are thus arranged around the optical axis. These sets are arranged in positions which do not overlap each other in the direction of the optical axis. In other words, three sets of female helicoid screw parts 5a are formed in a row. A plurality of second abutting parts 5c are respectively formed to extend along the optical axis between these sets of the female helicoid screw part 5a and the first abutting parts 5b which sets are arranged not to overlap each other in the direction of the optical axis. Further, a plurality of gear parts 5d are formed respectively along the sets of the female helicoid screw parts 5a and the first abutting parts 5b. The female helicoid screw parts 5a of the female helicoid tube 5 are carried by the male helicoid screw part 4a of the male helicoid tube 4 in the state of being engaged with each other.

A first lens group holding tube 6 has the above-stated first lens group 1 secured to the inside circumference side thereof. The first lens group holding tube 6 is integrally secured to the above-stated female helicoid tube 5.

A focus driving unit 7 including a motor as a drive source is provided with a focus shaft 7a and a focus driving gear 7b which is disposed at the fore end of the focus shaft 7a. The focus driving unit 7 is integrally secured to the male helicoid tube 4. The focus driving gear 7b meshes with the gear part 5d of the female helicoid tube 5. A diaphragm unit 8 consists of diaphragm blades 8a and a diaphragm driving part 8b which includes a motor as a drive source. The diaphragm unit 8 is secured to the above-stated male helicoid tube 4.

An electrical contact 9 is electrically connected to the camera body (not shown) and is arranged for communication with the camera body to control the focus driving unit 7 and the diaphragm unit 8. An exterior tube 10 is secured to the male helicoid tube 4.

The embodiment operates as described below:

A control signal which is generated by a known automatic focusing device disposed within the camera body is transmitted to the focus driving unit 7 through the electrical contact 9. Upon receipt of the control signal, the focus driving unit 7 rotates the focus shaft 7a and the focus driving gear 7b clockwise or counterclockwise according to the control signal. The rotating force from the focus driving gear 7b is transmitted to the gear part 5d of the female helicoid tube 5. Since the female helicoid screw parts 5a are engaging the male helicoid screw part 4a of the male helicoid tube 4, the female helicoid tube 5 is moved forward or backward in the direction of the optical axis along the lead of screw. Accordingly, the first lens group holding tube 6 which is secured to and arranged in one body with the female helicoid tube 5 and the first lens group 1 move forward or backward in the direction of the optical axis. The first lens group 1 is thus controlled to come to a stop at a point where an in-focus state is obtained. In this instance, even if the female helicoid tube 5 is in a drawn-out state, the female helicoid tube 5 stably moves back and forth without slanting or becoming eccentric as the first and second abutting parts 5b and 5c remain in a state of abutting on the outer circumferential face of the male helicoid screw part 4a of the male helicoid tube 4. Further, the screw engagement is never dislocated by shocks.

In the case of this embodiment, the gear parts 5d are arranged at a plurality of parts (5d1 to 5d3). However, it is possible to arrange these gears to have varied amounts of addendum modification; and, in assembling them, to select gears having optimum amounts of addendum modification in such a way as to eliminate backlash relative to the focus driving gear 7b of the focus driving unit 7. Such arrangement permits common use of parts, reduction in overall cost and also ease of management of parts.

Further, the above-stated advantageous effect is attainable with only the first abutting parts 5b or the second abutting parts 5c by omitting the other.

The embodiment described above is characterized in that the female helicoid screw parts 5a of the female helicoid tube 5 are arranged not to overlap each other in the direction of the optical axis. The arrangement enables the female helicoid tube 5 to be molded with a simple mold arrangement consisting of a stationary mold and a movable mold which is movable in the direction of the optical axis. This not only permits reduction in investment in facilities but also reduction in cost as the cycle of molding can be shortened. Further, the angle of the screw thread of the female helicoid screw parts 5a can be formed by adjusting it to that of the male helicoid screw part 4a. Therefore, helicoid screws can be arranged to have a male screw thread angle to facilitate control over the degree of backlash in the direction of the optical axis.

Further, the first abutting parts 5b which are formed along the female helicoid screw parts 5a of the female helicoid tube 5 are arranged to abut on the outside circumference of threads of the male helicoid screw part 4a. This prevents the female helicoid tube 5 from slanting or becoming eccentric and dislocation of screw engagement. The advantageous effect of the first abutting parts 5b is salient, particularly in cases where the female helicoid screw parts 5a are arranged in a single row (which tend to slant, to become eccentric and to dislocate screw engagement) like in the case of this embodiment. The advantageous effect is furthered by the provision of the second abutting parts 5c.

The structural arrangement of the mold is simplified by arranging the female helicoid screw parts 5a not to overlap each other in the direction of the optical axis. This enables the gear parts 5d to be easily formed in one body with the female helicoid tube 5 and thus permits reduction in the number of parts. Besides, the degree of positional precision can be enhanced. Further, while it suffices to arrange only one gear part 5d in an area corresponding to one of three sets of the female helicoid screw parts 5a, this embodiment is arranged to have the three gear parts 5d1 to 5d3 formed with different amounts of addendum modification. Therefore, backlash can be adjusted by simply changing the phase of assembly without having recourse to any special backlash adjustment mechanism.

In accordance with the arrangement of the embodiment of this invention as described, a lens barrel can be arranged to have the female helicoid screw part simply formed with a plastic material at a low cost and with minimal backlash.

Further, in accordance with the arrangement of this embodiment, a lens barrel can be arranged to prevent the female helicoid tube from slanting, becoming eccentric and having its screw engagement dislocated by shocks.

Further, the female helicoid tube of the embodiment can be arranged to have the gear parts formed or molded in one body with it as well as the female helicoid screw parts. A lens barrel thus can be arranged at a low cost with a reduced number of parts.

This invention is not limited to the lens barrel described in the foregoing as an embodiment thereof but is applicable also to other optical apparatuses of the kinds having optical elements arranged to be moved.

By way of summary, the invention will be seen to involve optical apparatus comprising an optical element and a moving mechanism having two members arranged to move the optical element in the direction of an optical axis thereof by moving one of the two members in the direction of the optical axis relative to the other while rotating said two members relative to each other. The two members include a male helicoid member having a male helicoid screw and a female helicoid member having a female helicoid screw arrangement in screw engagement with the male helicoid screw, the female helicoid screw arrangement providing only a single screw thread peripherally interiorly of the female helicoid member along an axis parallel to the optical axis.

The female helicoid member preferably is in a tubular shape, and the female helicoid screw arrangement includes a plurality of screw thread parts located successively along the optical axis and collectively defining the single screw thread.

What is claimed is:

1. An optical apparatus comprising:
   a) an optical element; and
   b) a moving mechanism having two members arranged to move said optical element in the direction of an optical axis thereof by moving one of said two members in the direction of the optical axis relative to the other while rotating said two members relative to each other, said two members including
      b-1) a male helicoid member having a male helicoid screw, and
      b-2) a female helicoid member having a female helicoid screw arrangement in screw engagement with said male helicoid screw, said female helicoid screw arrangement providing only a single screw thread peripherally interiorly of said female helicoid member along an axis parallel to said optical axis.

2. An apparatus according to claim 1, wherein said female helicoid member is molded with a plastic material integrally including said screw thread.

3. An apparatus according to claim 1, wherein said female helicoid member has an abutting part arranged to abut on an outside circumference of the male helicoid screw of said male helicoid member.

4. An apparatus according to claim 3, wherein said female helicoid member is molded with a plastic material integrally including said screw thread and said abutting part.

5. An apparatus according to claim 3, wherein said female helicoid member is in a tubular shape, wherein said female helicoid screw includes a plurality of screw thread parts located successively along the optical axis and collectively defining said single screw thread, and wherein said abutting part includes a plurality of abutting parts formed in positions corresponding to positions of said plurality of screw thread parts of said female helicoid screw.

6. An apparatus according to claim 3, wherein said optical apparatus is a lens barrel.

7. An apparatus according to claim 1, wherein said female helicoid member is in a tubular shape, and wherein said female helicoid screw arrangement includes a plurality of screw thread parts located successively along the optical axis and collectively defining said single screw thread.

8. An apparatus according to claim 1, further comprising a motor arranged as a drive source to move said female helicoid member in the direction of the optical axis while rotating said female helicoid member and to cause said optical element to move in association with the movement of said female helicoid member.

9. An apparatus according to claim 8, wherein said optical apparatus is a lens barrel.

10. An apparatus according to claim 1, wherein said optical apparatus is a lens barrel.

11. An optical apparatus comprising:
a) an optical element; and
b) a moving mechanism having two members arranged to move said optical element in the direction of an optical axis thereof by moving one of said two members in the direction of the optical axis relative to the other while rotating said two members relative to each other, said two members including
b-1) a male helicoid member having a male helicoid screw, and
b-2) a female helicoid member having a female helicoid screw arranged to be in screw engagement with said male helicoid screw, said female helicoid member including an abutting part formed along a screw thread of said female helicoid screw and arranged to abut on an outside circumference of a screw thread of said male helicoid screw.

12. An apparatus according to claim 11, wherein said female helicoid member further includes a second abutting part arranged to abut on the outside circumference of the screw thread of said male helicoid screw and formed along the optical axis.

13. An apparatus according to claim 11, wherein said abutting part includes a plurality of abutting parts formed on both sides of said screw thread of said female helicoid screw.

14. An apparatus according to claim 11, wherein said female helicoid member is in a tubular shape, and wherein said female helicoid screw provides only a single screw thread peripherally interiorly of said female helicoid member along an axis parallel to said optical axis and comprised of screw thread parts located successively along the optical axis and collectively defining said single screw thread.

15. An apparatus according to claim 14, wherein said female helicoid member further includes a plurality of second abutting parts arranged to abut on the outside circumference of the screw thread of said male helicoid screw, said plurality of second abutting parts being formed at respective end positions of said plurality of groups of said screw thread parts of said female helicoid screw along the optical axis.

16. An apparatus according to claim 15, wherein said optical apparatus is a lens barrel.

17. An apparatus according to claim 11, further comprising a motor arranged as a drive source to move said female helicoid member in the direction of the optical axis rotating said female helicoid member and to cause said optical element to move in association with the movement of said female helicoid member.

18. An apparatus according to claim 17, wherein said optical apparatus is a lens barrel.

19. An apparatus according to claim 11, wherein said optical apparatus is a lens barrel.

20. An optical apparatus comprising:
a) an optical element; and
b) a moving mechanism having two members arranged to move said optical element in the direction of an optical axis thereof by moving one of said two members in the direction of the optical axis relative to the other while rotating said two members relative to each other, said two members including:
b-1) a male helicoid member having a male helicoid screw; and
b-2) a female helicoid member having a female helicoid screw arranged to be in screw engagement with said male helicoid screw, said female helicoid member having a gear formed along a screw thread of said female helicoid screw, said gear having a plurality of teeth formed along the optical axis.

21. An apparatus according to claim 20, further comprising a motor and a second gear arranged to transmit the rotation of said motor and to rotate said female helicoid member by meshing with said gear of said female helicoid member.

22. An apparatus according to claim 21, wherein said optical apparatus is a lens barrel.

23. An apparatus according to claim 20, wherein said female helicoid member has an abutting part arranged to abut on an outside circumference of the male helicoid screw of said male helicoid member.

24. An apparatus according to claim 23, wherein said optical apparatus is a lens barrel.

25. An apparatus according to claim 20, wherein said female helicoid member is in a tubular shape, and wherein said female helicoid screw includes a plurality of groups of screw threads formed in a row around the optical axis.

26. An apparatus according to claim 25, wherein said gear includes a plurality of gear parts formed in correspondence to said plurality of groups of screw threads of said female helicoid screw, said plurality of gear parts having different amounts of addendum modification.

27. An apparatus according to claim 21, wherein said optical apparatus is a lens barrel.

* * * * *